L. GESCHWIND.
MECHANICAL DEVICE FOR THE REMOVAL OF DUST FROM THE GASES DERIVED FROM ROASTING ORES.
APPLICATION FILED JULY 20, 1920.
1,383,715. Patented July 5, 1921.
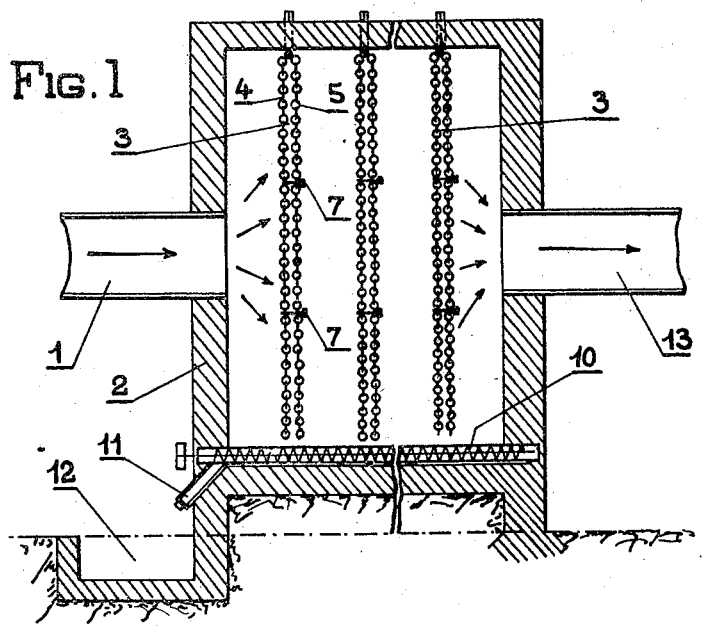
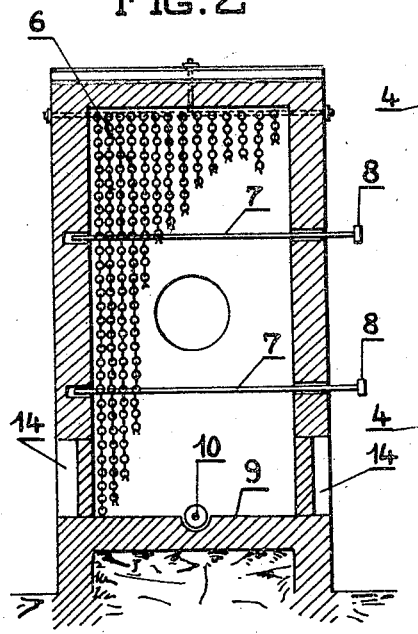
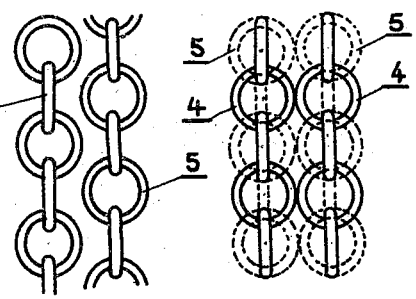
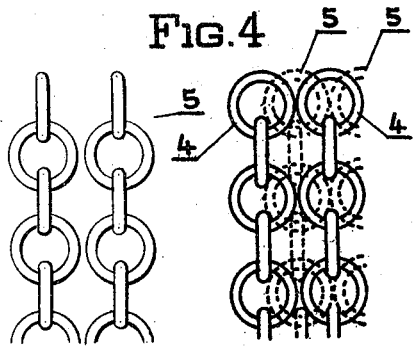
Inventor
L. Geschwind
By H. R. Kerslake
Attorney

UNITED STATES PATENT OFFICE.

LUCIEN GESCHWIND, OF PARIS, FRANCE, ASSIGNOR TO MANUFACTURE DE PRODUITS CHIMIQUES DU NORD, ETABLISSEMENTS KUHLMANN, OF PARIS, FRANCE.

MECHANICAL DEVICE FOR THE REMOVAL OF DUST FROM THE GASES DERIVED FROM ROASTING ORES.

1,383,715.      Specification of Letters Patent.      Patented July 5, 1921.

Application filed July 20, 1920. Serial No. 397,701.

*To all whom it may concern:*

Be it known that I, LUCIEN GESCHWIND, a citizen of the French Republic, of 117 Boulevard Haussmann, Paris, France, have invented new and useful Improvements in Mechanical Devices for the Removal of Dust from the Gases Derived from Roasting Ores, for which I have filed applications in Germany, May 6, 1914, in France, and in England, of which the following is a specification.

Many mechanical systems for the automatic removal of dust from the streams of gas produced during the process of roasting ores have already been invented. In certain cases the dust is abstracted by friction only, accompanied by a slowing down of the stream of gas, such slowing down being obtained by placing screens, chains or sieves parallel to the direction of the draft. In others the effect of shock is combined with this action, by arranging the sieves and chains perpendicular or obliquely in relation to the direction of the draft.

The present invention consists in an appliance by which the current of gas is split up *ad infinitum* and the length of track covered by its molecules extended while at the same time the actions of both friction and shock are exerted upon the said molecules. To this end the gas current is brought into obligatory contact, perpendicularly to the direction in which it is traveling, with a series of chain curtains, each of which is composed of a certain number of single rows of chains and separated from one another by empty spaces between them. The chains of the single rows forming each curtain are so disposed with respect to each other as to split up the gas current as finely as possible. On the other hand, the chains of each individual row hang side by side in close contact and as regularly as possible, so as to form a continuous and unbroken surface, the elements of which may, moreover, be connected together by wire ligatures. Lastly, the size of the links varies according to the case, but is always small enough to offer some slight resistance to the gas current.

The advantages of this appliance are as follows:—

(1) The friction and shock action is more effective than in the other systems on account of the arrangement of the single rows of chains forming each curtain;

(2) The expansion of the gas stream and the slowing down of the said stream in the intermediate spaces, each of which thus forms a species of depository chamber.

In certain cases the dust may be removed more rapidly by magnetizing the chain curtains.

The apparatus in question is extremely easy to clean. Mere knocking on the curtains is sufficient to cause the deposits of dust clinging to the chains to fall to the floor of the chamber, whence they are transported by a carrier, of the screw or other type, and emptied outside the said chamber.

One method of constructing the appliance is shown, for the purpose of example, in the annexed drawings, in which—

Figure 1 is a longitudinal section of a dust depository chamber;

Fig. 2 is a transverse section through the chamber;

Figs. 3 and 4 each represent side and front elevations of two methods of arranging the chains of two single rows of one curtain.

The gas is carried by the canal 1 to a chamber 2 forming a depository chamber for the dust contained in the gas. Inside the chamber 2 and perpendicularly to the direction in which the gas is traveling are arranged a certain number of chain curtains 3. Each of the said curtains is composed of two single rows 4 and 5 (Fig. 1), parallel one behind the other and so placed as to intercept the gas stream. Each row (Fig. 2) is in itself constituted by a series of hanging chains 6 placed side by side in contact with one another and as regularly as possible, the individual chains of a row being, if desired, fastened together.

Figs. 3 and 4 represent side and front views of two alternative arrangements for the two rows of chains forming one curtain.

In the arrangement shown in Fig. 3 each link lying north and south of a chain forming part of row 4 corresponds to a link lying east and west of row 5 immediately behind, or inversely. In this way a molecule of gas passing through the open part of a link of the first row is confronted with the solid part of a link of the second row which obliges it to split up.

In the arrangement shown in Fig. 4 the position of the links of row 5 merely varies by half a link from that of the links of row 4; the result is the same as above, a gas molecule never being able to follow a rectilinear direction without immediatetly being brought into contact with solid metal.

The distance between the two rows 4 and 5 should be about ten centimeters; on the other hand, two consecutive curtains 3 are separated by a distance of about fifty centimeters.

All the chains of the two single rows of one and the same curtain are connected to a series of projecting wires attached to handle 8 outside the chamber.

At the bottom 9 of the chamber is arranged a carrier formed, for example, by an endless screw 10; a conduit 11 connects the said carrier with a container 12 outside the chamber 2.

Lastly, a canal 13, situated opposite the canal 1, is provided for the exit of the dust-free gas, while manholes 14 are arranged in the walls of the chamber 2 for purposes of inspection, cleaning and taking the pressure.

The appliance works in the following manner:—

As it comes into contact with the curtains 3 the dust separates from the gas and is collected by the chains themselves, whence the least shock causes it to fall to the floor 9 of the chamber. Further, the friction produced by the succession of curtains effects a slight decrease in the load which forces the stream of gas to expand; the result is a slowing down in the speed of the gas in the space between two curtains and consequently a very active deposit of dust.

The dust retained by the chains may be released by manipulation of the projecting wires 7, but the chains should not be shaken in this way unless the apparatus be at a standstill and the chain curtains should remain absolutely immobile when the apparatus is at work. The dust which falls to the floor is transported by the carrier 10 and emptied into the container 12.

If necessary a series of chambers such as 2 may be placed along the path of the gas from which it is desired to abstract the dust. By applying this process to an installation of automatic pyrite furnaces, the removal of from 90 to 92 per cent. of the dust held in suspension has been effectively removed, and the Glover apparatus enabled to produce practically clear acids.

What I claim is:

1. A mechanical device for the removal of dust from gases derived from the roasting of ores, comprising a chamber; curtains composed of chains freely suspended and arranged perpendicularly to the current of gas, the links of said chains being of sufficiently small dimensions to oppose a slight resistance to the passage of the gaseous current, each of said curtains comprising several parallel rows and separated from one another by empty spaces between them forming depository chambers, the various chains of one and the same row being placed side by side and quite regularly, while the chains of two consecutive rows of one and the same curtains are arranged in combination with one another in such manner that a molecule of gas passing through the space of one link of the first chain passes in front of a solid portion of a link of the second chain.

2. A mechanical device for the removal of dust from gases derived from the roasting of ores comprising a chamber; curtains composed of chains hanging freely and arranged perpendicularly to the current of gas, the links of said chains being of sufficiently small dimensions to oppose a slight resistance to the passage of the gaseous current, each of said curtains comprising several parallel rows and separated from one another by empty spaces between them forming depository chambers, the various chains of one and the same row being placed side by side and quite regularly, while the chains of two consecutive rows of one and the same curtain are so arranged in combination with one another in such manner that a molecule of gas passing through the space of one link of the first chain passes in front of the solid portion of a link of the second chain, projecting wires connected to each of above said chains and handles, outside of the chamber, for manipulating said projecting wires.

In witness whereof I have hereunto set my hand in the presence of a witness.

LUCIEN GESCHWIND.

Witness:
CLEMENT S. EDWARDS.